(12) United States Patent
Schlögl

(10) Patent No.: US 9,099,217 B2
(45) Date of Patent: Aug. 4, 2015

(54) LINE ARRANGEMENT AND METHOD FOR PRODUCING SAME

(75) Inventor: Gerhard Schlögl, Wernberg-Köblitz (DE)

(73) Assignee: Hilde Schlägl, Wernberg-Köblitz (DE)

( * ) Notice: Subject to any disclaimer, the term of this patent is extended or adjusted under 35 U.S.C. 154(b) by 301 days.

(21) Appl. No.: 13/824,237

(22) PCT Filed: Aug. 31, 2011

(86) PCT No.: PCT/DE2011/001673
§ 371 (c)(1),
(2), (4) Date: Jun. 3, 2013

(87) PCT Pub. No.: WO2012/034553
PCT Pub. Date: Mar. 22, 2012

(65) Prior Publication Data
US 2014/0144665 A1    May 29, 2014

(30) Foreign Application Priority Data

Sep. 15, 2010  (DE) .......................... 10 2010 045 522

(51) Int. Cl.
| H01B 9/06 | (2006.01) |
| H01B 7/00 | (2006.01) |
| F16L 25/01 | (2006.01) |
| H02G 15/22 | (2006.01) |
(Continued)

(52) U.S. Cl.
CPC .............. *H01B 7/0072* (2013.01); *F16L 25/01* (2013.01); *H01B 13/00* (2013.01); *H01R 13/005* (2013.01); *H02G 15/22* (2013.01); *H01B 7/423* (2013.01); *H01R 4/72* (2013.01); *H01R 13/533* (2013.01); *H01R 2101/00* (2013.01); *H01R 2201/26* (2013.01); *Y10T 29/49174* (2013.01)

(58) Field of Classification Search
CPC ........ H01B 7/42; H01B 7/423; H01B 11/002; H01B 12/1821; H01B 12/183
USPC .............. 174/15.1, 15.4, 15.5, 15.7, 10, 11 R
See application file for complete search history.

(56) References Cited

U.S. PATENT DOCUMENTS

| 2,969,415 | A | * | 1/1961 | Hartill et al. ..................... 174/19 |
| 3,054,074 | A | * | 9/1962 | Bird et al. ..................... 333/22 R |
| 3,111,551 | A | * | 11/1963 | D Ascoli ....................... 174/15.6 |
| 3,716,652 | A | * | 2/1973 | Lusk et al. .................... 174/15.3 |
| 3,851,092 | A | * | 11/1974 | Talley .............................. 174/19 |

(Continued)

FOREIGN PATENT DOCUMENTS

| DE | 19740912 | 4/1999 |
| EP | 0593344 | 4/1994 |

*Primary Examiner* — William H Mayo, III
(74) *Attorney, Agent, or Firm* — Daniel A. Thomson; Emerson Thomson Bennett, LLC

(57) ABSTRACT

A line arrangement for transmitting high-power electrical energy and a pressurized fluid, having a hose that has a hose interior, an electrical conductor, at least one hose-terminating element having a hose-terminating element interior and at least one electrically conductive conductor-terminating element, wherein the electrical conductor is at least partially accommodated in the hose interior, a fluid channel is formed in the hose interior, the conductor-terminating element is arranged on the electrical conductor at a free end and is fastened in the hose-terminating element interior at a distance from the hose-terminating element, and an insulation means, which circumferentially enclose the electrical conductor and the conductor-terminating element, are provided at least in the transition region between the electrical conductor and the conductor-terminating element.

14 Claims, 2 Drawing Sheets

(51) Int. Cl.
  *H01B 13/00* (2006.01)
  *H01R 13/00* (2006.01)
  *H01B 7/42* (2006.01)
  *H01R 4/72* (2006.01)
  *H01R 13/533* (2006.01)
  *H01R 101/00* (2006.01)

(56) References Cited

U.S. PATENT DOCUMENTS 4,705,914 A * 11/1987 Bondon .................. 174/28
2010/0108020 A1 * 5/2010 Miretti .................. 123/198 D
2010/0294562 A1 * 11/2010 Dais et al. .................. 174/665

* cited by examiner

LINE ARRANGEMENT AND METHOD FOR PRODUCING SAME

This application is a national stage entry under 35 USC §371 of PCT/DE2011/001673. The invention relates to a line arrangement for transmitting electrical energy and a pressurized fluid as well as to a method for producing such a line arrangement.

BACKGROUND (1) Field

To date, the high-power energy transmission in the field of motor vehicles, commercial vehicles, construction and agricultural machinery takes place via hydraulic and/or mechanical concepts. Increasingly, attempts are made to use electric motors, the electrical energy of which is provided by a generator, which is driven by means of an internal combustion engine, in the case of a traction drive as well as in response to driving auxiliary equipment. For this purpose, it is necessary to provide the vehicle with an electrical network, to which any electrical generators and consumers, such as an electric generator, a traction drive, auxiliary equipment or electrically driven equipment, for example, can be coupled.

(2) Description of the Related Art

In particular in the case of commercial vehicles, it is necessary for the drives to have a high power, so that high electrical powers must be transmitted in the electrical network. In the context of this invention, high electrical powers are in particular understood to be powers in the range of between 50 KW and 300 KW with an electrical current of between 50 A and 400 A. In this power range, the dissipation of the heat, which is created in the drives, represents a central problem.

In particular liquid-cooled electrical drives, through the interior of which a fluid flows for dissipating the heat, have become known for the optimal heat dissipation. The liquid cooling of the drives provides for an extremely compact design thereof. In the case of a plurality of drives, which are provided so as to be distributed on the vehicle or on attachments of the vehicle, it is advantageous to provide for a coolant cycle comprising a central pump and a central cooler, to which the individual drives or consumers, respectively, are connected.

BRIEF SUMMARY

Based on this, the invention is based on the task of specifying a line arrangement, which can be produced in a simple and cost-efficient manner, which encompasses a design, which is as compact as possible, and which simultaneously provides for a transmission of high-power electrical energy and of a pressurized fluid. The task is solved based on the preambles of patent claims 1 and 8, in each case by means of the characterizing features thereof.

The significant aspect of the line arrangement according to the invention, which comprises a hose having a hose interior, an electrical conductor, at least one hose terminating element and at least one electrically conductive conductor-terminating element, lies in that the electrical conductor is at least partially accommodated in the hose interior, that a fluid channel is formed in the hose interior, that the conductor-terminating element is arranged on the electrical conductor at a free end and is fastened in the hose-terminating element interior at a distance from the hose-terminating element, and that insulation means, which circumferentially enclose the electrical conductor and the conductor-terminating element, are provided at least in the transition region between the electrical conductor and the conductor-terminating element. On the one hand, the significant advantage of the line arrangement according to the invention lies in the high electrical insulating effect of the parts, which can be touched, in particular of the hose-terminating element against the electrical conductor, which guides the electrical energy. On the other hand, a number of advantages follows from the arrangement of the electrical conductor in the interior of the hose, through which the fluid flows, namely on the one hand, the advantage of a high heat dissipation of the heat, which is created in the electrical conductor, while fluid flows around it, so that the cross section of the electrical conductor can be minimized; on the other hand, the advantage of an optical inspection possibility of the line arrangement in that the pressurized fluid escapes when the hose wall is damaged and that information relating to an insulation of the line arrangement, which is possibly also damaged, is provided.

In a further preferred exemplary embodiment, the electrical conductor encompasses at least one electrically conducting core in the form of a strand or of a wire and a fluid-resistant insulation, which surrounds this core. By providing an electrically insulated conductor in the interior of the hose, it is possible for the electrical conductor to be capable of moving freely movable in the hose, aside from the free ends, at which it is held so as to be centred in the hose, so that, due to the electrical insulation, there is no necessity of an accommodation of the electrical conductor in the hose interior, which is supported at least in sections. A cost-efficient production of the line arrangement is attained through this.

In a further preferred exemplary embodiment, a pressure-resistant hose comprising a hose wall, which includes an electrically conductive fabric, is used as hose. By using a fabric, a high stability of the hose is attained, whereby by providing an electrically conductive fabric, for example a metallic fabric, the possibility is created through the latter that the electrical conductor is guided in the hose so as to be shielded by the electrically conductive fabric, so that electromagnetic radiation, which occur due to current or voltage fluctuations, respectively, is shielded by the fabric and cannot be deflected into the environment. A high electromagnetic tolerance is effected through this. In a further preferred exemplary embodiment, the hose-terminating element is connected to the fabric of the hose in an electrically conductive and electrically conducting manner. It is attained through that, when connecting the line arrangement to a motor or generator, for example, the housing of which is at ground potential, this ground potential is transmitted to the fabric of the hose via the hose-terminating element and thus an electrical protective screen, which encompasses ground potential, for example, surrounds the entire line arrangement.

In a particularly preferred manner, the hose-terminating element is embodied as a press sleeve, at least in sections. A simple and cost-efficient connection of the hose, which can preferably be a hydraulic hose, can be attained by means of the hose-terminating element, namely a connection, which cannot only be stressed mechanically to a high degree, but which is also fluid-tight.

In a further preferred exemplary embodiment, the electrical insulating means, which are provided in the transition area between the electrical conductor and the conductor-terminating element, are formed by means of a shrink hose or a moulded part, for example an injected moulded part. Due to the bending property of the line arrangement and the free movability of the electrical conductor in the hose, the electrical conductor is subject to increased mechanical stresses, in particular at the transition to the conductor-terminating element, in which the core of the electrical conductor is fastened by means of crimping or soldering, for example. On the one hand, the provision of insulating means at this transition effects a virtually continuous stiffness transition between the conductor-terminating element defined in the hose-terminating element and the electrical conductor, which is freely movable in the hose, so that the mechanical stress in the transition between electrical conductor and the conductor-terminating element is minimized or the mechanical stability is increased by means of the insulating means, respectively. On the other hand, a cost-efficient and simple electrical subsequent insulation of this transition area is ensured to increase the insulating effect of the electrical conductor or of the conductor-terminating element, respectively, relative to the hose-terminating element, which is at ground potential. This is advantageous, in particular in the case of a hose-terminating element, which is embodied as an angle piece.

In a further preferred exemplary embodiment, the conductor-terminating element is held in the hose-terminating element, which enables fluid channels to allow the fluid to pass in axial direction of the conductor-terminating element, so as to be centred by means of an electrically non-conducting insulating element. By using an insulating element, a simple and cost-efficient stationary fixation of the conductor-terminating element relative to the hose-terminating element is provided on the one hand. On the other hand, a high insulation effect of the conductor-terminating element relative to the hose-terminating element, which is at ground potential, can be attained.

In a particularly preferred manner, the conductor-terminating element is fastened so as to be detachable relative to the insulating element and the insulating element is fastened so as to be detachable relative to the hose-terminating element, whereby the fastening is preferably carried out by means of securing means, for example securing rings. A cost-efficient assembly of the conductor-terminating element in the hose-terminating element and a simplified maintenance or repair, respectively, of the conductor arrangement, can be carried out through this.

A further aspect of the invention relates to a method for producing a line arrangement for transmitting high-power electrical energy and a pressurized fluid, comprising the provision of a hose having a hose wall and a hose interior, at least one electrical conductor, at least one hose-terminating element and at least one electrically conductive conductor-terminating element, wherein the conductor-terminating element is arranged at the free end of the electrical conductor and the hose-terminating element is arranged at the free end of the hose wall, the electrical conductor is inserted into the hose interior and the conductor-terminating element is arranged in the hose-terminating element interior at a distance from the hose-terminating element. A line arrangement for transmitting high-power electrical energy and a pressurized fluid can be provided through this in a simple and cost-efficient manner.

In a preferred exemplary embodiment, the conductor-terminating element is detachably connected to the hose-terminating element. A simplified assembly and an improved capability to maintain the line arrangement are attained through this.

In a particularly preferred exemplary embodiment, the electrical conductor is trimmed to a length, which is larger than the length of the hose. The assembly of the conductor-terminating element in the hose-terminating element is simplified considerably through this by means of the insulating element, because the second line-terminating element, which is provided on the opposite end of the line arrangement, projects slightly beyond the hose-terminating element after the assembly or fixation, respectively, of the first conductor-terminating element by means of the insulating element in the hose-terminating element, so that the free end of the hose-terminating element can be seized easily and so that there is no danger that the latter retracts back into the hose interior or the hose-terminating element, respectively. In a further preferred exemplary embodiment, the transition area between the electrical conductor and the conductor-terminating element is insulated subsequently circumferentially, for example by means of a shrink hose, so that an increased insulating effect of the live parts relative to the adjacent hose-terminating element, which is at ground potential, and a virtual continuous stiffness transition results between the conductor-terminating element, which is fixed in the hose-terminating element, and the electrical conductor, which can move freely in the hose.

Further developments, advantages and application possibilities of the invention furthermore also result from the following description of exemplary embodiments and from the figures. All of the features, which are described and/or depicted, alone or in any combination are thereby on principle the subject matter of the invention, regardless of the combination thereof in the claims or of the dependency thereof. The content of the claims is also made to form a part of the description.

BRIEF DESCRIPTION OF THE SEVERAL VIEWS OF THE DRAWING(S)

DETAILED DESCRIPTION

Figure 1:
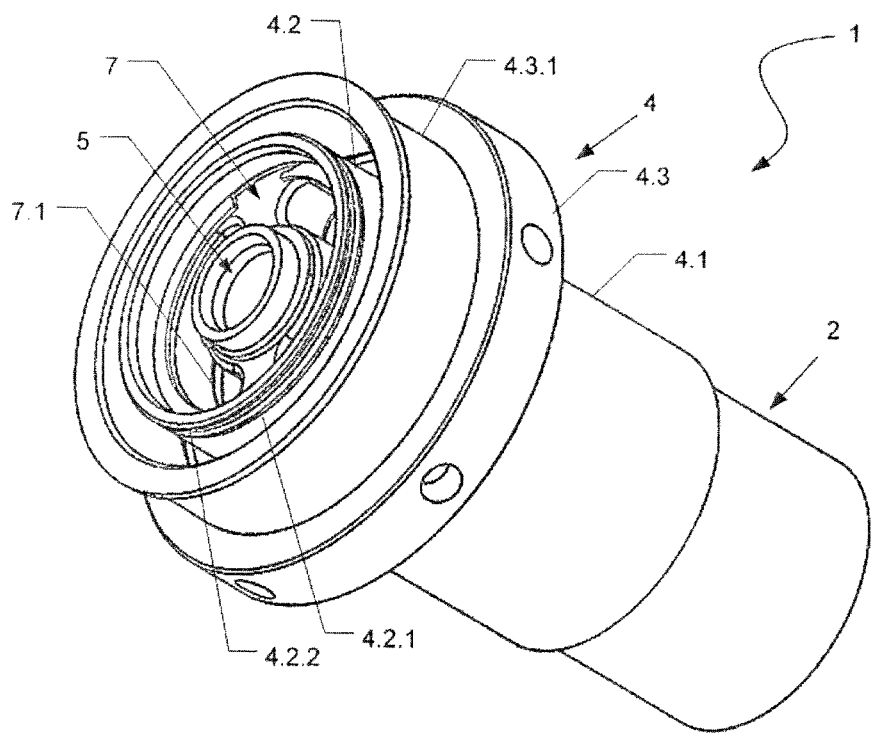
FIG. 1 shows a line arrangement according to the invention in an exemplary manner in a perspective sectional illustration.
Figure 2:
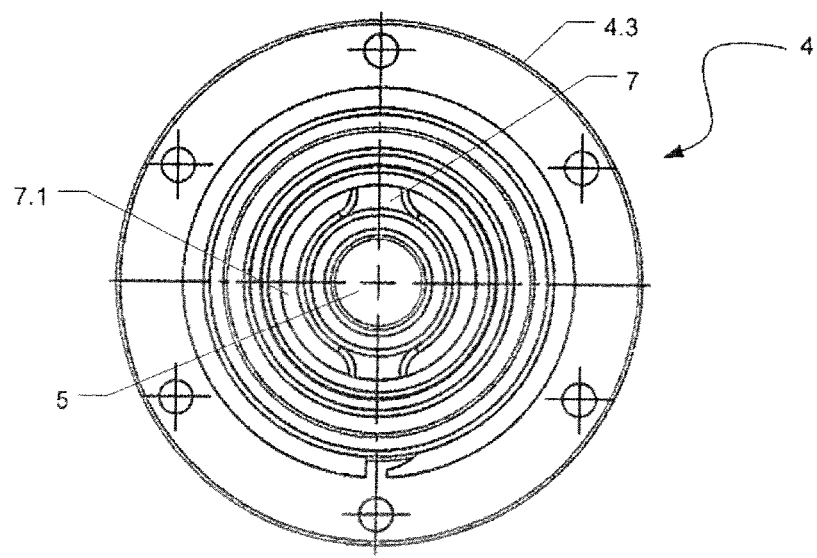
FIG. 2 shows a top view illustration onto the free end of a line arrangement according to the invention in an exemplary manner.
Figure 3:
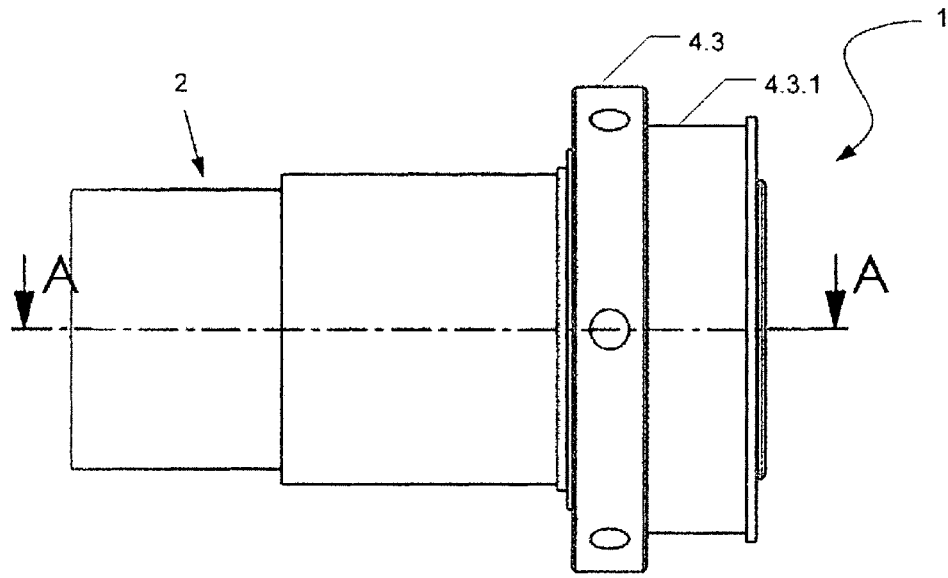
FIG. 3 shows a line arrangement according to the invention in an exemplary manner in a side view.
Figure 4:
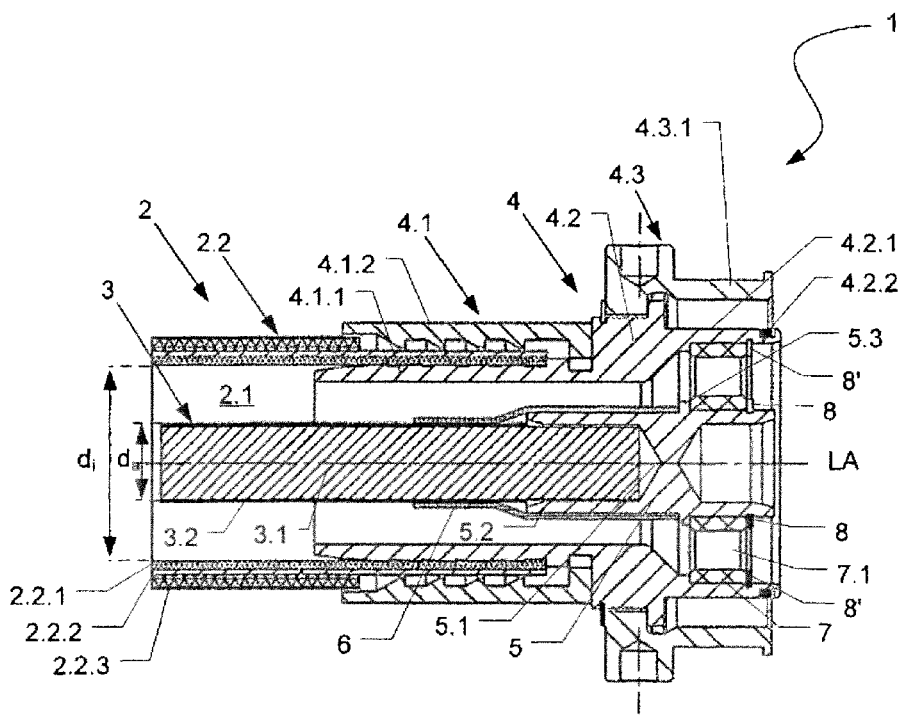
FIG. 4 shows a line arrangement according to the invention in an exemplary manner in a lateral sectional illustration along the sectional line A-A according to FIG. 3.

A line arrangement according to the invention is in each case shown with reference numeral 1 in FIGS. 1-4 in sectional illustrations. The line arrangement 1, which is formed for transmitting high-power electrical energy and a pressurized fluid, consists substantially of a line, which is formed by means of a hose 2 having a hose interior 2.1 as fluid channel and an electrical conductor 3, which is accommodated in the hose interior 2.1 and which, at least at an end on the free end, encompasses a line termination, which is formed by a hose-terminating element 4 and an electrically conductive conductor-terminating element 5.

According to the invention, the electrical conductor 3 is at least partially accommodated in the hose interior 2.1, a fluid channel is formed in the hose interior 2.1, the conductor-terminating element 5 is arranged on the electrical conductor 3 at the free end and is fastened in the hose-terminating interior so as to be at a distance from the hose-terminating element 4 and provision is made at least in the transition area between the electrical conductor 3 and the conductor-terminating element 5 for insulating means 6, which circumferentially enclose the electrical conductor 3 and the conductor-terminating element 5. A significant advantage of the line arrangement 1 according to the invention consists in the compact design and the simultaneous transmission of high-power electrical energy or of a fluid, respectively. By forming the fluid channel around the electrical conductor 3, this fluid contributes in the cooling thereof, so that, due to the high heat dissipation through the fluid surrounding the electrical conductor 3, the cross section of the electrically conductive core 3.1 of the electrical conductor 3 can be dimensioned so as to be smaller than in the case of a non-cooled electrical conductor 3. An optical insulation inspection results additionally by surrounding the electrical conductor with the fluid channel, because an escape of the fluid takes place in response to damages to the hose, and thus provides information for a possible lack of insulation.

The hose 2, which defines the line towards the outside, encompasses a hose wall 2.2, which is set up in multiple layers, for example comprising a round or polygonal cross section. The first hose wall layer 2.2.1, which defines the hose interior 2.1, is formed by means of a rigid, elastically deformable plastic, for example an elastomer, which is fluid-resistant with reference to the fluid, which is to be transmitted in the hose interior 2.1. A liquid coolant or an oil, in particular an insulating oil, for example, can be transmitted as fluid.

A second hose wall layer 2.2.2, which is formed by an electrically conductive fabric, in particular a metallic fabric, connects to the first hose wall section 2.2.1 towards the outside. On the one hand, the fabric serves to stabilize the hose 2, so as to be able to transmit a pressurized fluid in the hose interior 2.1. On the other hand, a uniform ground potential, which furthermore serves as a screen against the deflection of electromagnetic radiation, which is created by current or voltage fluctuations, respectively, on the electrical conductor 3, is established by means of the electrically conductive fabric between the components, which are connected to the line arrangement 1.

A third hose wall layer 2.2.3, which, for example, is in turn formed from an elastically deformable plastic, in particular an elastomer and which acts as protective layer for the first and second hose wall layer 2.2.1, 2.2.2 located therebelow, connects to the second hose wall layer 2.2.2, preferably on the outer side.

In a particularly preferred manner, a hydraulic hose consisting of first to third hose wall layers 2.2.1, 2.2.2, 2.2.3, is used as hose 2. On the one hand, these hoses 2 are characterized by a high stability against external influences. On the other hand, fluids can be transmitted under a high pressure by means of hydraulic hoses, so that, depending on the area of application, a high fluid flow and thus a high cooling of the electrical conductor 3 is attained.

In a preferred exemplary embodiment, the electrical conductor 3 consists of an electrically conducting core 3.1, for example in the form of a strand or a solid wire, wherein the use of a strand is preferred due to the conductor cross section in the range of between 50 mm$^2$ and 150 mm$^2$, preferably approximately 100 mm$^2$, which is required for transmitting high-power electrical energy. The core 3.1 of the electrical conductor 3 is circumferentially surrounded by an electrically non-conducting insulation 3.2, which is formed by means of an elastically deformable plastic, for example. This insulation 3.2 is preferably formed so as to be fluid-resistant, so that the electrical conductor 3, the outer diameter $d_a$ of which is smaller than the inner diameter $d_i$ of the hose interior 2.1, can be accommodated so as to move freely, that is, not supported in the hose 2 by means of spacers at least in sections, but in the hose 2 only by simply drawing it in, whereby a sufficient electrical insulation of the core 3.1. of the electrical line 3, which transmits high voltages or high currents, respectively, is ensured relative to the electrically conductive fabric, which forms the second hose wall layer 2.2.2 by means of the insulation 3.2 and the first hose wall section 2.2.1.

Due to the small outer diameter $d_a$ of the electrical conductor 3 as compared to the inner diameter $d_i$ of the hose 2, a continuous fluid channel, through which the pressurized fluid can flow, results around the electrical conductor 3 in the hose interior 2.1. Provision is made at least at a free end, preferably at both free ends of the line for line-terminating elements, which, in the shown exemplary embodiment, are formed substantially by means of the hose-terminating element 4 and the conductor-terminating element 5. The hose-terminating element 4 is embodied in a sleeve-shaped manner and encompasses a fastening section, by means of which the hose-terminating element 4 can be fixed in a fluid-tight manner relative to the hose wall 2.2 of the hose 2. In the shown exemplary embodiment, the fastening section is formed by means of the press sleeve section 4.1., which consists of an inner sleeve section 4.1.1 and an outer press sleeve 4.1.2, which is to be pressed with the inner sleeve section 4.1.1. An annular gap, into which the free end of the hose 2 can be inserted, is formed between the press sleeve 4.1.2 and the sleeve section 4.1.1 prior to the pressing of the press sleeve 4.1.2 relative to the sleeve section 4.1.1.

Preferably, the third hose wall layer 2.2.3 is removed prior to the insertion of the free end of the hose 2, so that the second hose wall layer 2.2, which is embodied as a fabric, is exposed. An electrically conductive connection is established through this between the electrically conductive fabric and the press sleeve 4.1.2 or the hose-terminating element 4, respectively, which are embodied in a particularly preferred manner so as to be electrically conductive, so that a uniform ground potential is established between the connected components in response to the connection of the hose-terminating element 4 to a component, for example a motor, a generator, a distributor or the like, via the hose-terminating element 4 and the electrically conductive fabric. In a particularly preferred manner, the hose-terminating element 4 is formed so as to be metallic, in particular of nickel-plated steel.

A connecting section 4.2, which is also embodied in a substantially sleeve-shaped manner with a preferably centred inner opening, is connected to the press sleeve section 4.1 of the hose-terminating element 4 towards the side, which faces away from the hose 2. This connecting section 4.2 serves to couple the line arrangement 1 to components, to which the line arrangement 1 can be connected, thus for example motors, generators, distributors or the like. In the shown exemplary embodiment, the connecting section 4.2 is embodied so as to be plug-shaped, but, different therefrom, could also be embodied as socket, as flange or the like. On the free end, the connecting section 4.2 encompasses a circumferential sealing surface 4.2.1, on the free end of the edge of which a seal 4.2.2 is introduced. This sealing surface 4.2.1 or the seal 4.2.2, respectively, serve to seal the connection of the line arrangement 1 at the components, which are to be connected, in a liquid-tight manner.

On the outer circumferential side, the connecting section 4.2 is surrounded by a cap nut, which is held on the connecting section 4.2 so as to be rotatable about the longitudinal axis LA of the line arrangement 1, and which encompasses a web 4.3.1, which sticks out on the free end, comprising an internal thread, which is located opposite the sealing surface 4.2.1. The hose-terminating element 4 can be fastened to the component, which is to be connected, by means of a screw-connection via this cap nut 4.3.

A conductor-terminating element 5, which is connected to the core 3.1 of the electrical conductor 3 so as to be electrically conductive, is arranged in the inner opening, which is embodied in the interior of the hose-terminating element 4 at a distance and preferably so as to be centred.

The conductor-terminating element 5 is held in the hose-terminating element 4 via an insulating element 7, which is embodied in a ring-shaped manner, in the inner opening of the hose-terminating element 4. The insulating element 7 hereby encompasses an outer diameter, which is adapted to the inner diameter of the inner opening of the hose-terminating element 4 in the area of the free end. The insulating element 7 furthermore has an inner opening, which is adapted to the outer diameter of the conductor-terminating element 5 in the area of the free end, which sticks out from the electrical conductor 3, so that the conductor-terminating element 5 can be guided through the inner opening of the insulating element 7 in sections. On the one side, the axial fastening of the conductor-terminating element 5 relative to the hose-terminating element 4 is carried out by means of sections of the conductor-terminating element 5 or of the hose-terminating element 4, respectively, which engage behind the insulating element 7, on the other side by means of the securing means, for example securing rings 8, 8', which engage with the hose-terminating element 4 or the conductor-terminating element 5, respectively. A detachable fastening and thus an easy assembly or maintenance, respectively, of the line arrangement 1 is made possible by using securing rings 8, 8' for fastening the conductor-terminating element 5 in the hose-terminating element 4.

In addition to the inner opening, which accommodates the conductor-terminating element 4, the insulating element 7 encompasses at least one, preferably a plurality of fluid channels 7.1, which penetrate the insulating element 7 in axial direction, based on the longitudinal axis LA of the line arrangement 1. The fluid, which is guided in the hose interior 2.1, can thus be transmitted beyond the inner opening of the hose-terminating element 4 through the insulating element 7 to the connected component.

In the shown exemplary embodiment, the conductor-terminating element 5 is embodied as a conductor sleeve and encompasses at least one inner opening 5.1, which faces the electrical conductor 3 and which is embodied as a blind hole and which is laterally defined by wall sections 5.2. The wall sections 5.2 are hereby embodied such that the conductor-terminating element 5 can be connected to the electrically conductive core in a mechanical and electrically conductive manner by means of crimping.

To ensure a high insulating effect of the electrically conductive core 3.1 relative to the hose-terminating element 4, which is at ground potential, provision is made for insulating means 6, which surround the electrical conductor 3 and the conductor-terminating element 5 in the transition area between the electrical conductor 3 and the conductor-terminating element 5 at least in sections. In a particularly preferred manner, a shrink hose is used as insulating means 6. In the shown exemplary embodiment, this shrink hose covers the conductor-terminating element 5 up to the projection 5.3, which is provided for fixation relative to the insulating element 7, starting at the insulation 3.2 of the electrical conductor 3.

The method, which is used to produce the line arrangement 1, will be described below in more detail. A line-termination, which is formed from hose-terminating element 4 and conductor-terminating element 5, is hereby in each case attached on the free end of a line, which is formed by a hose 2 and an electrical conductor 3, so that a line, which is assembled on both sides, is established.

At the onset of the method, the hose 2, which preferably encompasses an electrically conductive fabric as middle hose wall layer 2.2, is cut to a desired length. In the case that the fabric is surrounded on the outer circumferential side by means of a third hose wall layer 2.2.3 of electrically non-conducting material, this third hose wall layer 2.2.3 is removed or flash removed, respectively, across a partial length, which substantially corresponds to the longitudinal extension of the press sleeve section 4.1 of the hose-terminating element 4. The hose-terminating element 4 is subsequently fastened on both sides of the hose wall 2.2 of the hose 2, in particular the press sleeve section 4.1 is pressed to the hose wall 2.2. A high mechanical stability of the fastening of the hose-terminating element 4 on the hose 2 is attained through this, while ensuring the liquid-tightness and the electrically conductive connection between the fabric and the hose-terminating element 4.

The electrical conductor 3 is subsequently cut to a length, which is preferably slightly larger than the length of the hose 2. The electrical conductor 3 is stripped across a partial length on both sides at the free ends, so that the electrically conductive core 3.1 of the electrical conductor 3 is exposed. The length of the stripping hereby preferably corresponds to the depth of the inner opening 5.1. The stripped core 3.1 of the electrical conductor 3 is subsequently inserted into the inner opening 5.1 of the conductor-terminating element 5 and the conductor-terminating element 5 is preferably fastened to the electrical conductor 3 by means of mechanical deformation of the wall section 5.2, that is, by means of crimping, so that a friction-locked, electrically conductive connection is established between the conductor-terminating element 5 and the electrical conductor 3. To ensure a high insulating effect relative to the hose-terminating element 4, the conductor-terminating element 5 and the electrical conductor 3 are additionally insulated in the transition area between the electrical conductor 3 and the conductor-terminating element 5 by means of insulating means 6, which are in particular formed by means of a shrink hose. The further conductor-terminating element 5 is fastened to the opposite free end of the electrical conductor 3 in the same manner.

To prevent the free end, which is located opposite to the inserted free end of the electrical conductor, to also come to rest within the hose 2 when the electrical conductor 3 is drawn into the hose 2, an insulating element 7 is slid onto a conductor-terminating element 5 and is secured by means of the securing ring 8. The electrical conductor 3 is subsequently inserted into the hose 2 with the opposite free end, to which no insulating element 7 is fastened, or is pulled into the hose 2, respectively, with the help of a taut wire. A fixation of the electrical conductor 3 relative to the hose wall 2.2 preferably does not take place hereby, so that, aside from the bracket on the free end, the electrical conductor 3 can move freely in the hose-terminating elements 4 relative to the hose wall 2.2. After drawing the electrical conductor 3 into the hose 2, the insulating element 7, which is already preassembled on the conductor-terminating element 5 by means of the securing ring 8, is secured relative to the hose-terminating element 4 by means of a further securing ring 8', so that the line arrangement 1 is fully assembled on the free end. The insulating element 7 is subsequently pushed onto the further free end of the conductor-terminating element 5 and the insulating element 7 is secured relative to the hose-terminating element 4 by introducing the securing rings 8, 8'.

A tightness test of the line arrangement 1 as well as a rinsing with a fluid is carried out after the assembly, so that foreign particles or foreign matter, respectively, which is contained in the fluid channel due to the assembly, are flushed out. An electrical conductivity test between the two conductor-terminating elements 5, that is, in particular a conductivity test between the two transitions conductor-terminating element 5 and electrically conductive core 3.1, as well as an insulation test of the hose-terminating elements 4 relative to the conductor-terminating elements 5 is carried out afterwards.

The invention has been described above by means of an exemplary embodiment. It goes without saying that numerous modifications and changes to the invention are possible, without hereby leaving the inventive idea.

LIST OF REFERENCE NUMERALS

1 line arrangement
2 hose
2.1 hose interior
2.2 hose wall
2.2.1 first hose wall layer
2.2.2 second hose wall layer
2.2.3 third hose wall layer
3 electrical conductor
3.1 core
3.2 insulation
4 hose-terminating element
4.1 press sleeve section
4.1.1 sleeve section
4.1.2 press sleeve
4.2 connecting section
4.2.1 sealing surface
4.2.2 seal
4.3 cap nut
4.3.1 web
5 conductor-terminating element
5.1 inner opening
5.2 wall section
5.3 projection
6 insulating means
7 insulating element
7.1 fluid channel
8, 8' securing ring
$d_a$ outer diameter
$d_i$ inner diameter
LA longitudinal axis

The invention claimed is:

1. A line arrangement for transmitting high-power electrical energy and a pressurized fluid, comprising a hose (2) having a hose interior (2.1), an electrical conductor (3), at least one hose-terminating element (4) having a hose-terminating element interior and at least one electrically conductive conductor-terminating element (5), characterized in that the electrical conductor (3) is at least partially accommodated in the hose interior (2.1), that a fluid channel is formed in the hose interior (2.1), that the conductor-terminating element (5) is arranged on the electrical conductor (3) at a free end and is fastened in the hose-terminating element interior at a distance from the hose-terminating element (4), and that insulation means (6), which circumferentially enclose the electrical conductor (3) and the conductor-terminating element (5), are provided at least in the transition region between the electrical conductor (3) and the conductor-terminating element (5).

2. The line arrangement according to claim 1, characterized in that the electrical conductor (3) encompasses at least one electrically conducting core (3.1) in the form of a strand or of a wire and a fluid-resistant insulation (3.2), which surrounds this core (3.1).

3. The line arrangement according to claim 1, characterized in that the hose (2) encompasses a pressure-resistant hose (2) comprising a hose wall (2.2), which encompasses an electrically conductive fabric.

4. The line arrangement according to claim 1, characterized in that the hose-terminating element (4) is embodied so as to be sleeve-shaped and/or as a press sleeve, at least in sections.

5. The line arrangement according to claim 3, characterized in that the hose-terminating element (4) is connected to the fabric of the hose (2) in an electrically conductive and electrically conducting manner.

6. The line arrangement according to claim 1, characterized in that the insulating means (6), which are provided in the transition area between the electrical conductor (3) and the line-terminating element (5), are formed by means of a shrink hose or a moulded part.

7. The line arrangement according to claim 1, characterized in that the conductor-terminating element (5) is held so as to be centred in the hose-terminating element interior by means of an electrically non-conducting insulating element (7) and/or is fastened in the hose-terminating element (5) so as to be detachable.

8. A method for producing a line arrangement for transmitting high-power electrical energy and a pressurized fluid, comprising the provision of a hose (2) having a hose wall (2.2) and a hose interior (2.1), at least one electrical conductor (3), at least one hose-terminating element (4) and at least one electrically conductive conductor-terminating element (5), characterized in that the conductor-terminating element (5) is arranged at the free end of the electrical conductor (3) and the hose-terminating element (4) is arranged at the free end of the hose wall (2.2), that the electrical conductor (3) is inserted into the hose interior (2.1) and that the conductor-terminating element (5) is arranged in the hose-terminating element interior at a distance from the hose-terminating element (4).

9. The method according to claim 8, characterized in that the conductor-terminating element (5) is connected to the hose-terminating element (4) so as to be detachable.

10. The method according to claim 8, characterized in that a hose (2) comprising an electrically conductive fabric and an electrically conductive hose-terminating element (4) is used in the hose wall (2.2) and that the hose-terminating element (4) is connected and/or pressed to the electrically conductive fabric in an electrically conducting manner.

11. The method according to claim 8, characterized in that the conductor-terminating element (5) is fixed in the hose-terminating element (4) by means of an insulating element (7).

12. The method according to claim 8, characterized in that the electrical conductor (3) is cut to a length, which is larger than the length of the hose (2).

13. The method according to claim 8, characterized in that a hydraulic hose is used as hose (2) and a cable comprising a fluid-resistant insulation (3.2) is used as electrical conductor (3).

14. The method according to claim 8, characterized in that the electrical conductor (3) is stripped at least in the transition area between electrical conductor (3) and conductor-terminating element (5).

* * * * *

UNITED STATES PATENT AND TRADEMARK OFFICE
CERTIFICATE OF CORRECTION

PATENT NO. : 9,099,217 B2  
APPLICATION NO. : 13/824237  
DATED : August 4, 2015  
INVENTOR(S) : Gerhard Schlögl Page 1 of 1

It is certified that error appears in the above-identified patent and that said Letters Patent is hereby corrected as shown below:

Title page, item (73) Assignee: should read as follows: Hilde Schlögl, Wernberg-Köblitz (DE)

Signed and Sealed this  
Fifteenth Day of December, 2015

Michelle K. Lee  
*Director of the United States Patent and Trademark Office*